(12) United States Patent
Liu et al.

(10) Patent No.: US 7,373,961 B2
(45) Date of Patent: May 20, 2008

(54) WORKTABLE THAT IS EXTENDIBLE IN TWO STEPS

(75) Inventors: Chia-Sheng Liu, Chiayi County (TW); Chieh-Yuan Tsai, Taichung County (TW)

(73) Assignee: Durq Machinery Corp., Taichung (TW)

( * ) Notice: Subject to any disclaimer, the term of this patent is extended or adjusted under 35 U.S.C. 154(b) by 0 days.

(21) Appl. No.: 11/783,624

(22) Filed: Apr. 11, 2007

(65) Prior Publication Data

US 2007/0284017 A1    Dec. 13, 2007

Related U.S. Application Data

(62) Division of application No. 11/149,354, filed on Jun. 10, 2005, now Pat. No. 7,240,706.

(30) Foreign Application Priority Data

Mar. 24, 2005   (TW) .............................. 94204607 U

(51) Int. Cl.
*B25H 1/14*      (2006.01)

(52) U.S. Cl. .................. 144/286.1; 144/287; 83/437.1; 83/477.2

(58) Field of Classification Search ................ 144/285, 144/286.1, 286.5, 287; 83/469, 477, 477.2, 83/474–476, 437.1; 108/102, 143
See application file for complete search history.

(56) References Cited

U.S. PATENT DOCUMENTS

| | | | |
|---|---|---|---|
| 5,201,863 | A | 4/1993 | Peot |
| 6,189,429 | B1 | 2/2001 | Liu |
| 6,508,281 | B1 | 1/2003 | Wang |
| 6,619,348 | B2 | 9/2003 | Wang |
| 6,817,275 | B1 | 11/2004 | Chin-Chin |

*Primary Examiner*—Shelley M. Self
(74) *Attorney, Agent, or Firm*—Bacon & Thomas, PLLC

(57) ABSTRACT

A worktable includes two first rails arranged in parallel on a base, two guide rods movable along the first rails in a first direction and a second direction reversed to the first direction, two second rails respectively slidably coupled to the guide rods, a sliding plate fixedly mounted on the second rails, and a positioning device for locking the sliding plate to stop the sliding plate from movement relative to the base.

1 Claim, 17 Drawing Sheets

WORKTABLE THAT IS EXTENDIBLE IN TWO STEPS

CROSS-REFERENCE TO RELATED APPLICATION

This application is a divisional application of pending U.S. application Ser. No. 11/149,354, filed Jun. 10, 2005, now U.S. Pat. No. 7,240,706 (of which the entire disclosure is hereby incorporated by reference).

BACKGROUND OF THE INVENTION

1. Field of the Invention

The present invention relates to a work platform for a sawing machine and more particularly, to a worktable that is extendible in two steps.

2. Description of the Related Art

FIGS. 1-3 show a platform assembly for attaching to an object constructed according to U.S. Pat. No. 6,619,348. The platform assembly 1 comprises a base 2, two beams 3, two rails 4, a first end board 5, a second end board 5', four blocks 6, a plate 7, and two stops 8. The beams 3 are disposed in parallel on the top wall of the base 2, each having a groove 3a formed therein. The two rails 4 are respectively slidably received in the groove 3a of each beam 3. The first and second end boards 5 and 5' respectively secured to the ends of the rails 4. The four blocks 6 are secured to the bottom wall of the plate 7 and coupled to the rails 4 to selectively engage with either of the end boards 5 and 5'. The plate 7 is slidably supported on the rails 4. The two stops 8 are disposed on the base 2 between the beams 3. FIG. 2 is a schematic drawing showing the plate 7 moved leftwards. When two of the four blocks 6 are moved with the plate 7 leftwards after contacting the first end board 5, the two rails 4 will be moved together with the plate 7, and the movement of the plate 7 will be stopped upon engagement of the second end board 5' with the stops 8. At this time, the plate 7 is at the left side of the base 2 as shown in FIG. 3.

According to the aforesaid design, the plate 7 is slidable relative to the base 2 to extend the work area of the object supporting the platform assembly 1. In actual practice, this design of platform assembly 1 is still not satisfactory in function. As shown in FIG. 2, when the plate 7 is stopped after having been extended out, the plate 7 protrudes over the base 2 at a distance. At this time, the plate 7 is partially coupled to and supported in the groove 3a of each beam 3 through the rails 4. When the plate 7 carries a heavy object, the rails 4 may be forced to curve or break due to excessive long arm of force.

Further, because the plate 7 and the two rails 4 are not lockable, they slide freely within a range. More particularly after the plate 7 has been extended out, it may be pushed back accidentally. This unexpected retraction of the plate 7 makes trouble in the processing work.

Therefore, it is desirable to provide a worktable that eliminates the aforesaid drawbacks.

SUMMARY OF THE INVENTION

The present invention has been accomplished under the circumstances in view. It is one object of the present invention to provide a worktable, which has an extendible working surface and a stable supporting structure.

To achieve this object of the present invention, the worktable comprises a base having a top wall; at least one first rail fixedly mounted on the top wall of the base, the at least one first rail each having a guide groove, a first stop and a second stop; at least one guide rod respectively received in the guide groove of each of the at least one first rail and alternatively movable in a first direction and a second direction reversed to the first direction, the at least one guide rod each having a first end and a second end; a first end strip fixedly fastened to the first end of each of the at least one guide rod for stopping the at least one guide rod from movement in the first direction when the first end strip touched the first stop of each of the at least one first rail; a second end strip fixedly fastened to the second end of each of the at least one guide rod for stopping the at least one guide rod from movement in said second direction when the second end strip touched the second stop of each of the at least one first rail; a sliding plate slidably supported on the at least one guide rod, the sliding plate having a bottom wall; and at least one second rail fixedly mounted on the bottom wall of the sliding plate, the at least one second rail having a guide groove, which receives one of the at least one guide rod, a first push portion, which enables the at least one guide rod to be moved in the first direction when touching the second end strip, and a second push portion, which enables the at least one guide rod to be moved in the second direction when touching the first end strip.

DETAILED DESCRIPTION OF THE INVENTION

Figure 1:
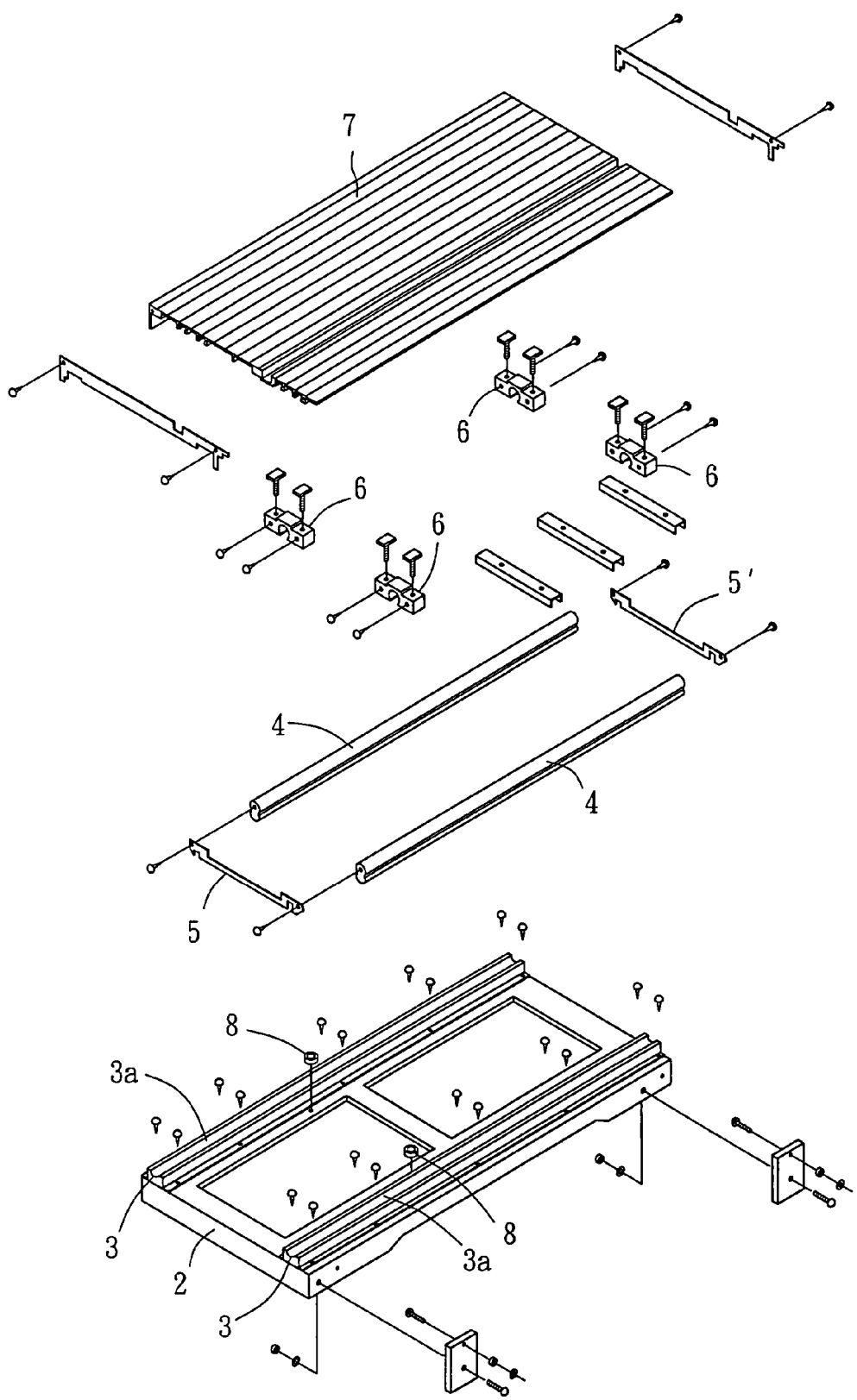
FIG. 1 is an exploded view of an adjustable and extendible platform assembly for working table according to U.S. Pat. No. 6,619,348.
Figure 2:
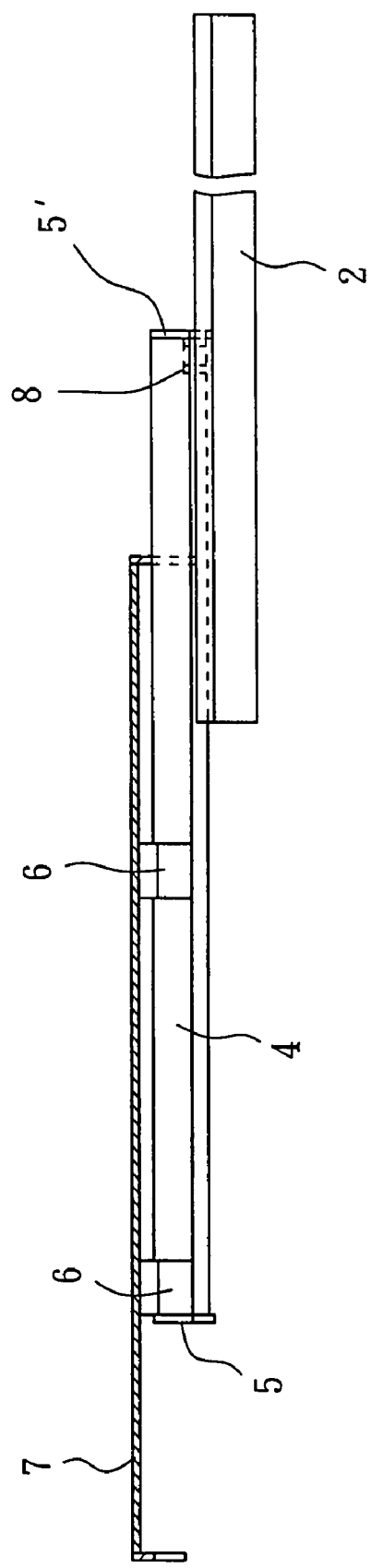
FIG. 2 is a sectional view of a part of FIG. 1.
Figure 3:
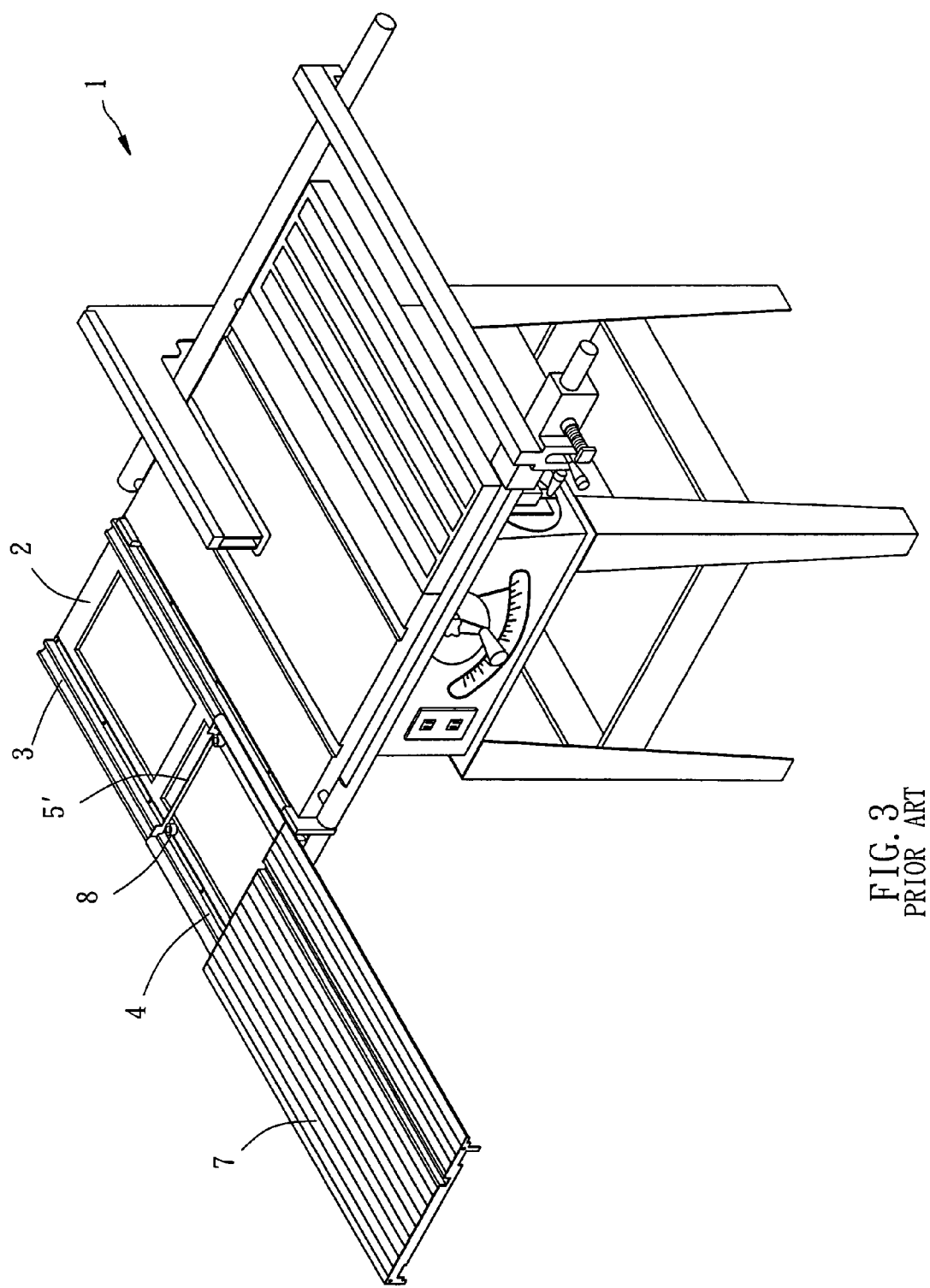
FIG. 3 is a schematic drawing showing an application example of the adjustable and extendible platform assembly shown in FIG. 1.

Referring to FIGS. 4-7, a worktable 100 is shown attached to a saw machine base 200. The worktable 100 comprises a base 10, two first rails 16, two guide rods 20, a first end strip 24, a second end strip 26, a sliding plate 28, two second rails 30, a positioning device 34, and a limiter 36.

The base 10 comprises a main platform 12 and a supplementary platform 14. The main platform 12 comprises a working surface 121, a front fence 122 and a left-side fence 123, an elongated slot 124 formed in the front fence 122, three notches 125, 126 and 127 formed in the front fence 122 in communication with the elongated slot 124, and a through hole 128 formed in the left-side fence 123. The supplementary platform 14 comprises a top wall 141 disposed at a relatively lower elevation than the working surface 121 and divided into a first connecting section 143 and an open-space section 144 and a second connecting section 145, a sidewall 142, and a through hole 146 formed in the sidewall 142 corresponding to the through hole 128 in the left-side fence 123 of the main platform 12.

Figure 4:
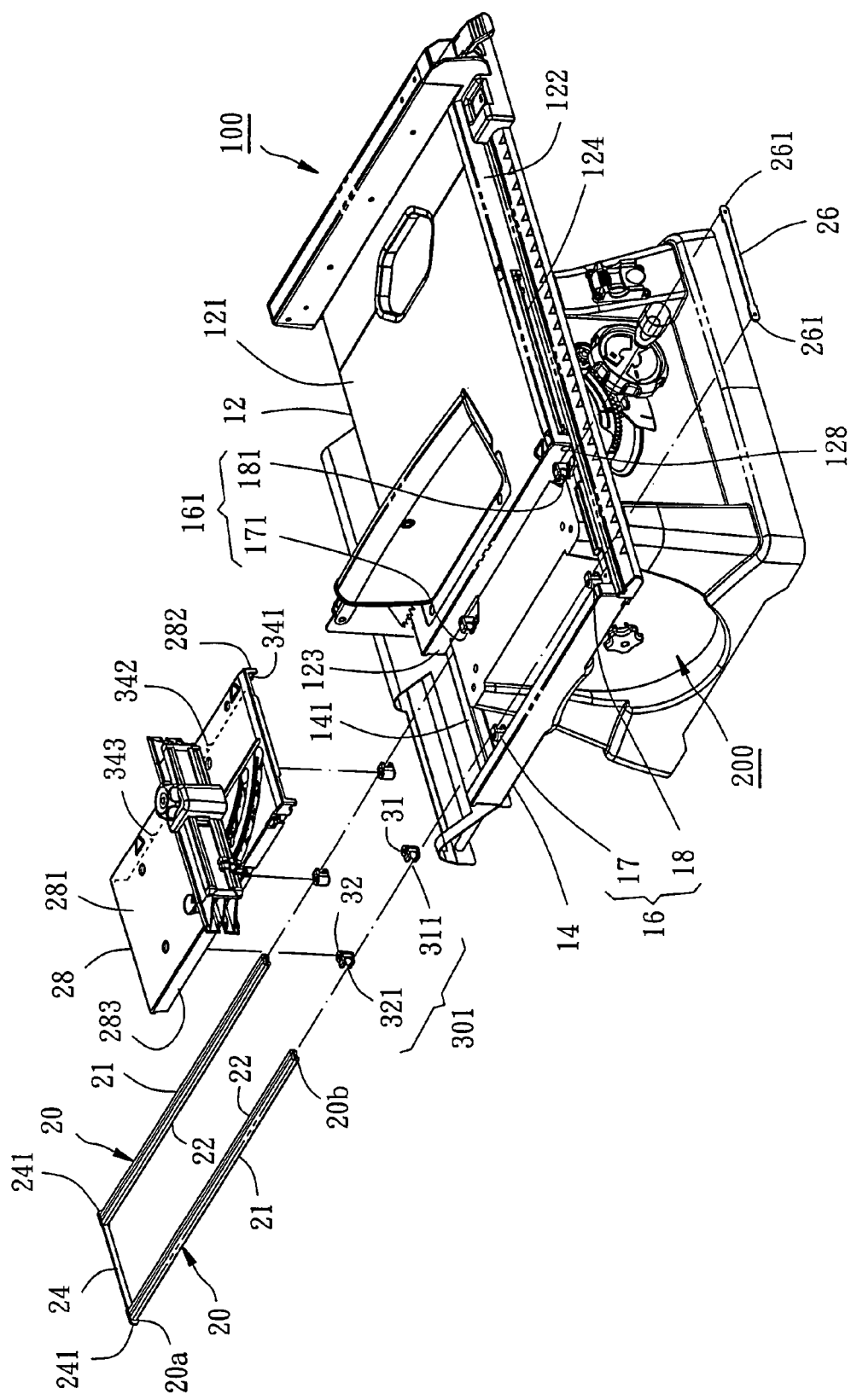
FIG. 4 is an exploded view of a worktable according to a first embodiment of the present invention.

The two first rails 16 are respectively fixedly mounted on the first connecting section 143 and second connecting section 145 of the supplementary platform 14, each having a guide groove 161, a first stop 162 and a second stop 163. As shown in FIG. 4, each first rail 16 is formed of a first locating block 17 and a second locating block 18. The first locating block 17 has a groove 171. The second locating block 18 has a groove 181. The grooves 171 and 181 are axially connected in a line, thereby forming the guide groove 161. One side of the first locating block 17 forms the first stop 162 and one side of the second locating block 18 forms the second stop 163.

The two guide rods 20 each are comprised of a first rod body 21 and a second rod body 22 arranged in parallel. The first rod body 21 of each of the guide rods 20 is respectively received in the guide groove 161 in each of the two first rails 16 so that the two guide rods 20 can be alternatively moved relative to the base 10 in a first direction D1 and a second direction D2 reversed to the first direction D1. Further, each guide rod 20 has a first end 20a and a second end 20b.

The first end strip 24 is fixedly connected to the first end 20a of each of the two guide rods 20. The second end strip 26 is fixedly connected to the second end 20b of each of the two guide rods 20. Therefore, the two guide rods 20 form with the first end strip 24 and the second end strip 26 a rectangular open frame. Further, the first end strip 24 has a lug 241 at each of the two ends thereof, and the second end strip 26 also has a lug 261 at each of the two ends thereof.

The sliding plate 28 comprises a planar plate body 281 and two side strips 282 and 283. The area of the sliding plate 28 is approximately equal to the top wall 141 of the supplementary platform 14.

Figure 6:
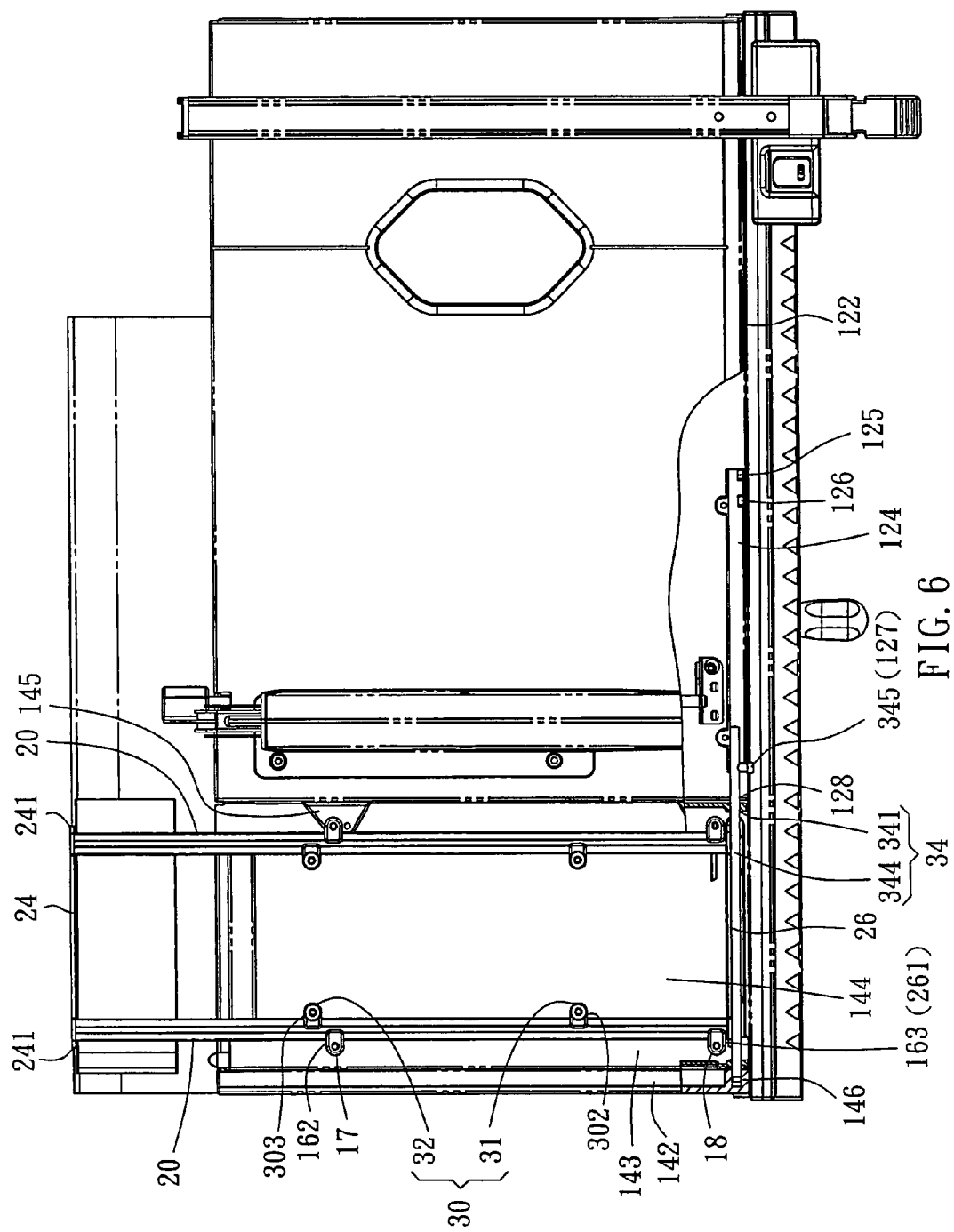
FIG. 6 is a top view of the worktable corresponding to the position shown in FIG. 5, showing the positioning rod locked the sliding plate.
Figure 7:
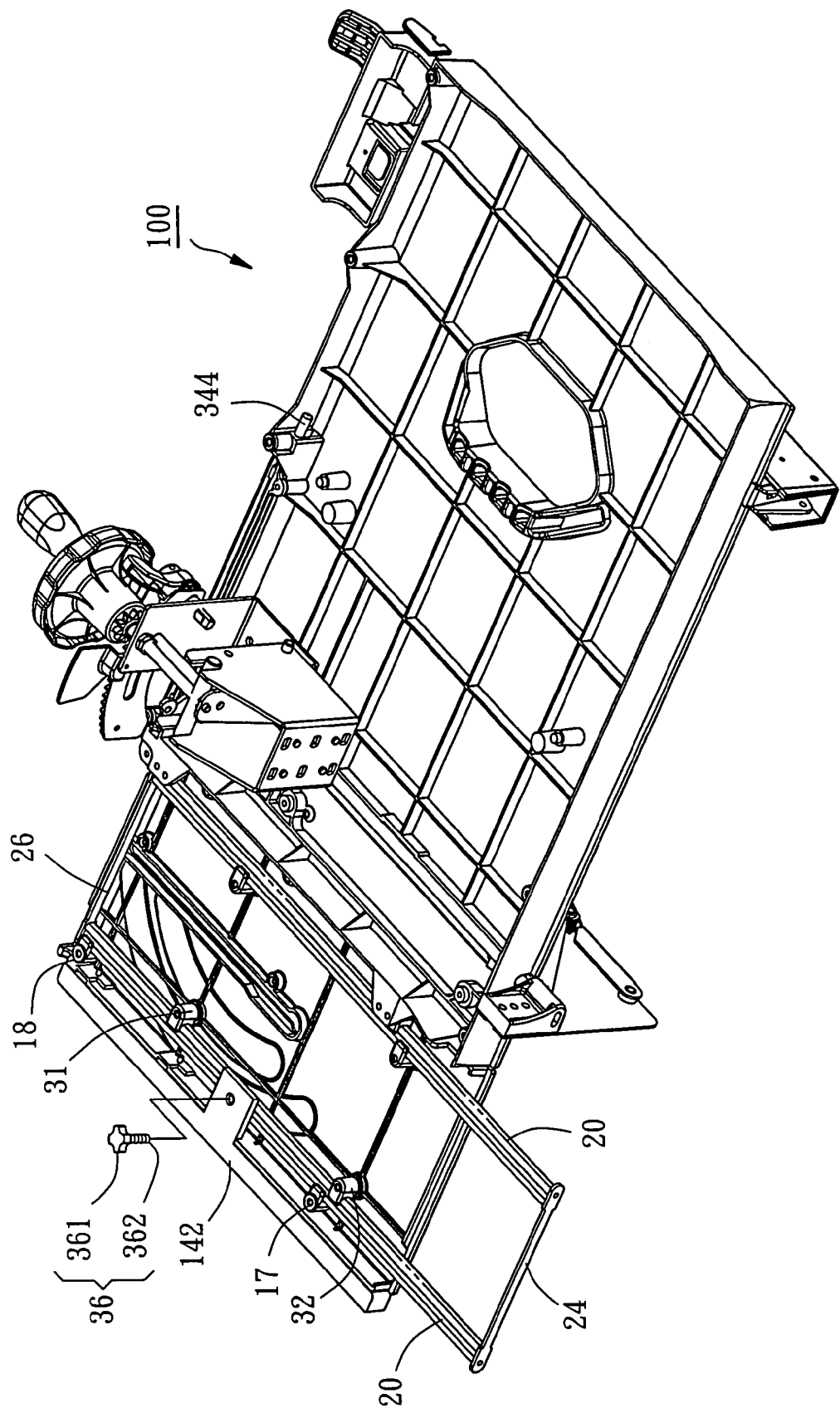
FIG. 7 is a schematic bottom view of the worktable according to the first embodiment of the present invention.

The two second rails 30 are fixedly mounted on the bottom side of the planar plate body 281 of the sliding plate 28, each having a guide groove 301, a first push portion 302, and a second push portion 303. As shown in FIGS. 4 and 6, each second rail 30 is formed of a first sliding block 31 and a second sliding block 32. The first sliding block 31 has a groove 311 formed therein. The second sliding block 32 has a groove 321 formed therein. The groove 311 and the groove 321 form the guide groove 301 of the respective second rail 30. The guide groove 301 of each second rail 30 receives the second rod body 22 of each of the two guide rods 20 respectively, enabling the sliding plate 28 to be slidably supported on the two guide rods 20. Further, the first sliding block 31 has one side forming the first push portion 302, and the second sliding block 32 has one side forming the second push portion 303.

The positioning device 34 comprises three positioning holes 341, 342 and 343 formed in one side strip 282 of the sliding plate 28, and a positioning rod 344 kept behind the front fence 122 of the main platform 12 (see FIG. 6). The positioning rod 344 has a finger block 345 projecting into the elongated slot 124 in the front fence 122 of the main platform 12 for pulling by the user with the fingers to move the positioning rod 344 alternatively backwards and forwards in a linear direction. When the finger block 345 is moved into one notch 125, 126 or 127, the positioning rod 344 is stopped from movement.

The limiter 36 according to this embodiment is a screw bolt fastened to the sidewall 142 of the supplementary platform 14, having a head 361 and an end 362. Through the head 361, the user can rotate the limiter 36 to press the end 362 against one guide rod 20.

After understanding of the component parts of the worktable 100 and their relative positions, the operation of the worktable 100 is described hereinafter.

Figure 5:
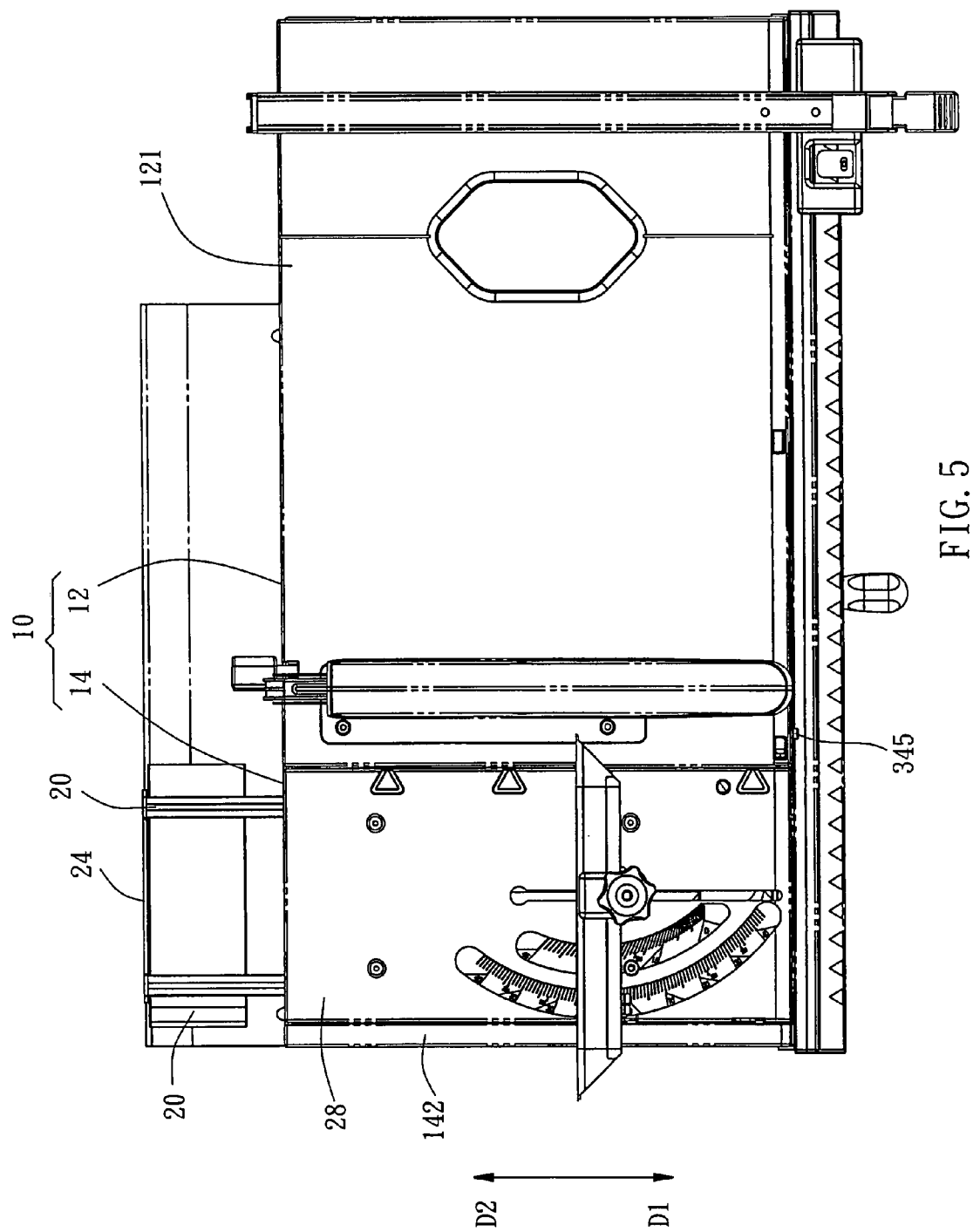
FIG. 5 is top view of the worktable according to the first embodiment of the present invention.

Referring to FIGS. 5 and 6, before pushing the sliding plate 28, the lugs 261 of the second end strip 26 are respectively abutted against the second stop 163 of the first rails 16 to prevent sliding of the sliding plate 28 in the second direction D2. The positioning rod 344 is inserted with one end thereof into the through hole 128 in the left-side fence 123 of the main platform 12, the positioning hole 341 and then the through hole 146 in the sidewall 142 of the supplementary platform 14. When the finger block 345 is moved into the notch 127, the positioning rod 344 prevents sliding of the sliding plate 28 in the first direction D1.

Figure 8:
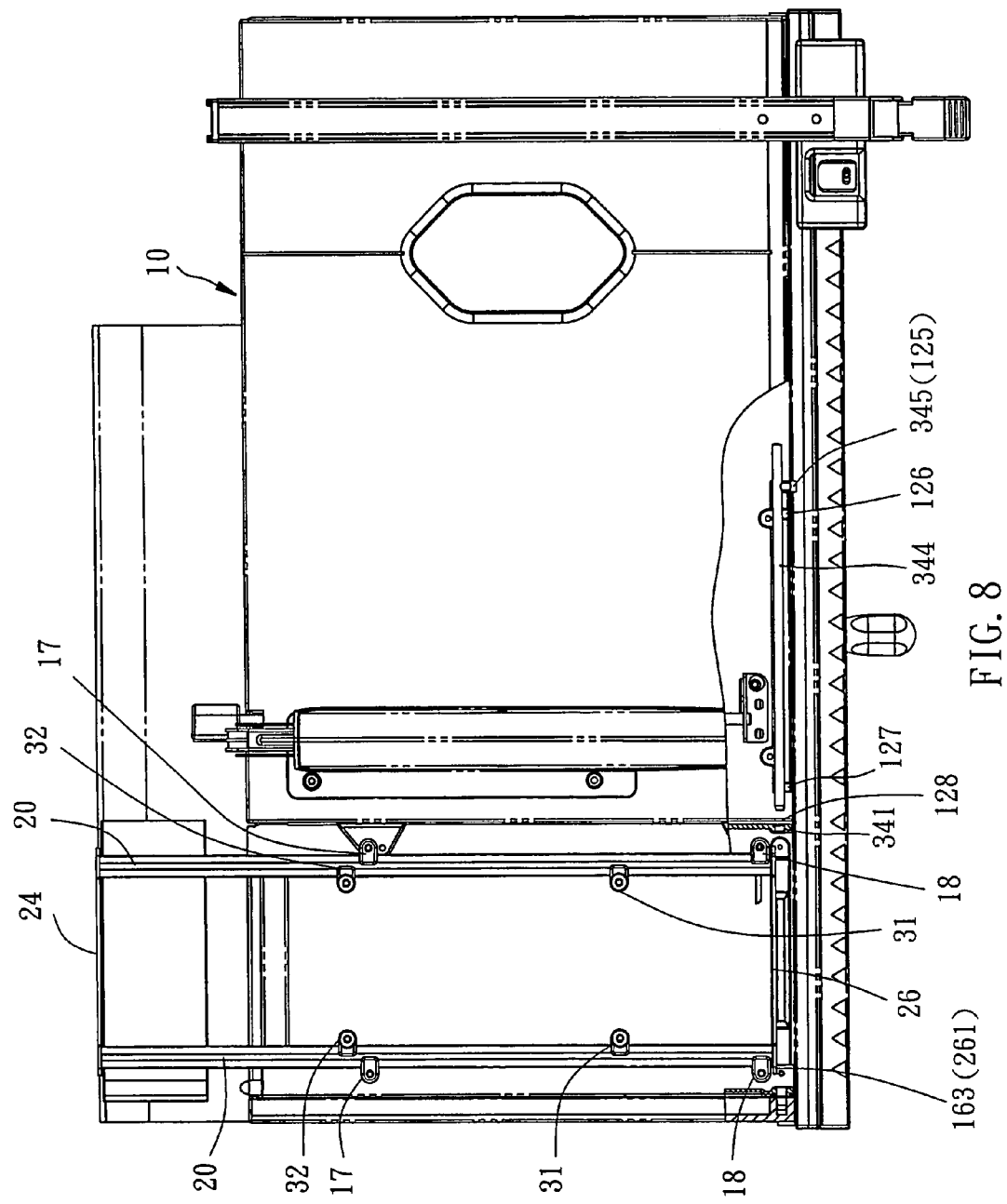
FIG. 8 corresponds to FIG. 6, showing the positioning rod unlocked from the sliding plate.
Figure 9:
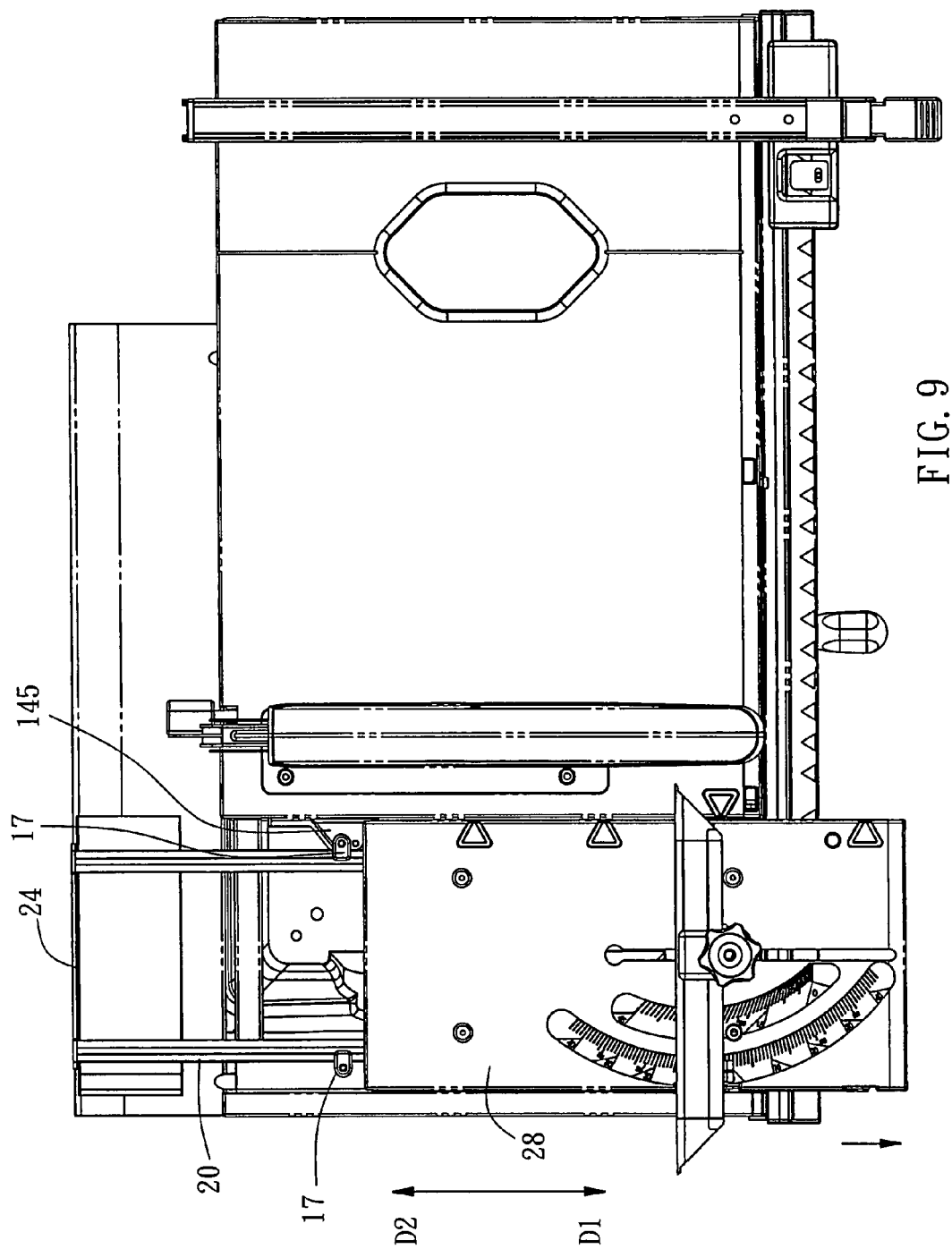
FIG. 9 corresponds to FIG. 5, showing the sliding plate continuously moved in the first direction.
Figure 10:
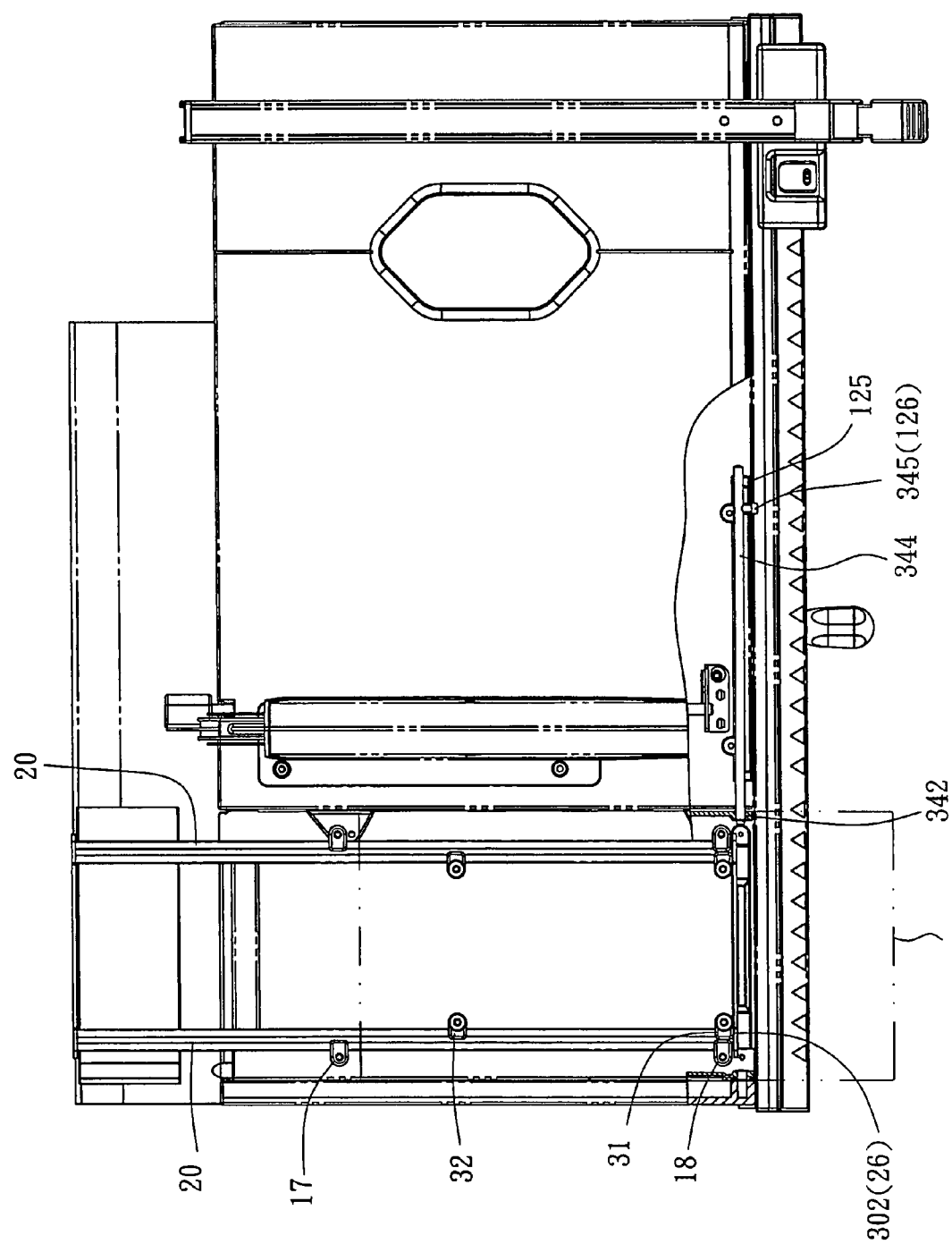
FIG. 10 a top view of the worktable corresponding to the position shown in FIG. 9, showing the positioning rod locked the sliding plate.
Figure 11:
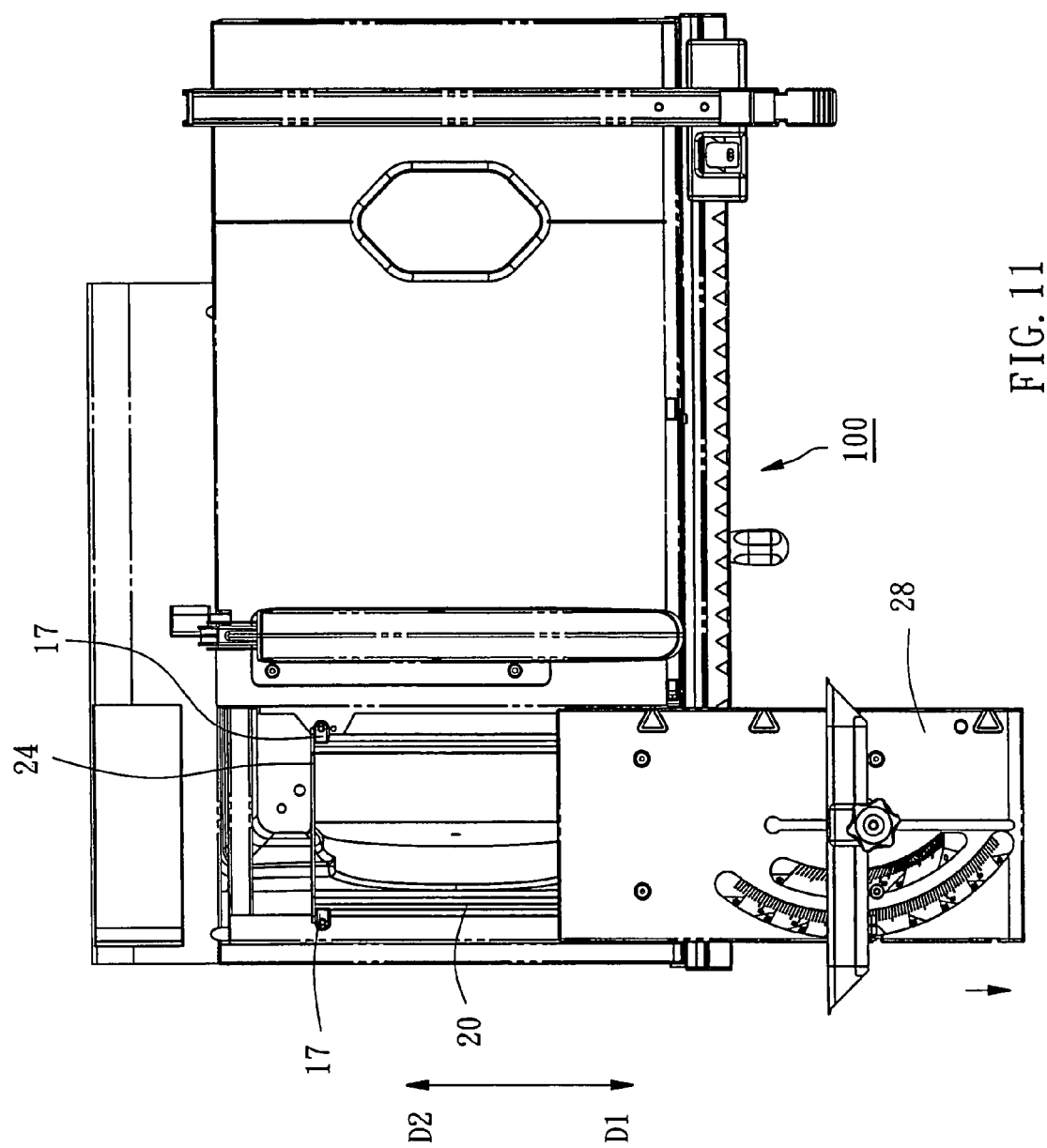
FIG. 11 corresponds to FIG. 9, showing the sliding plate continuously moved in the first direction.
Figure 12:
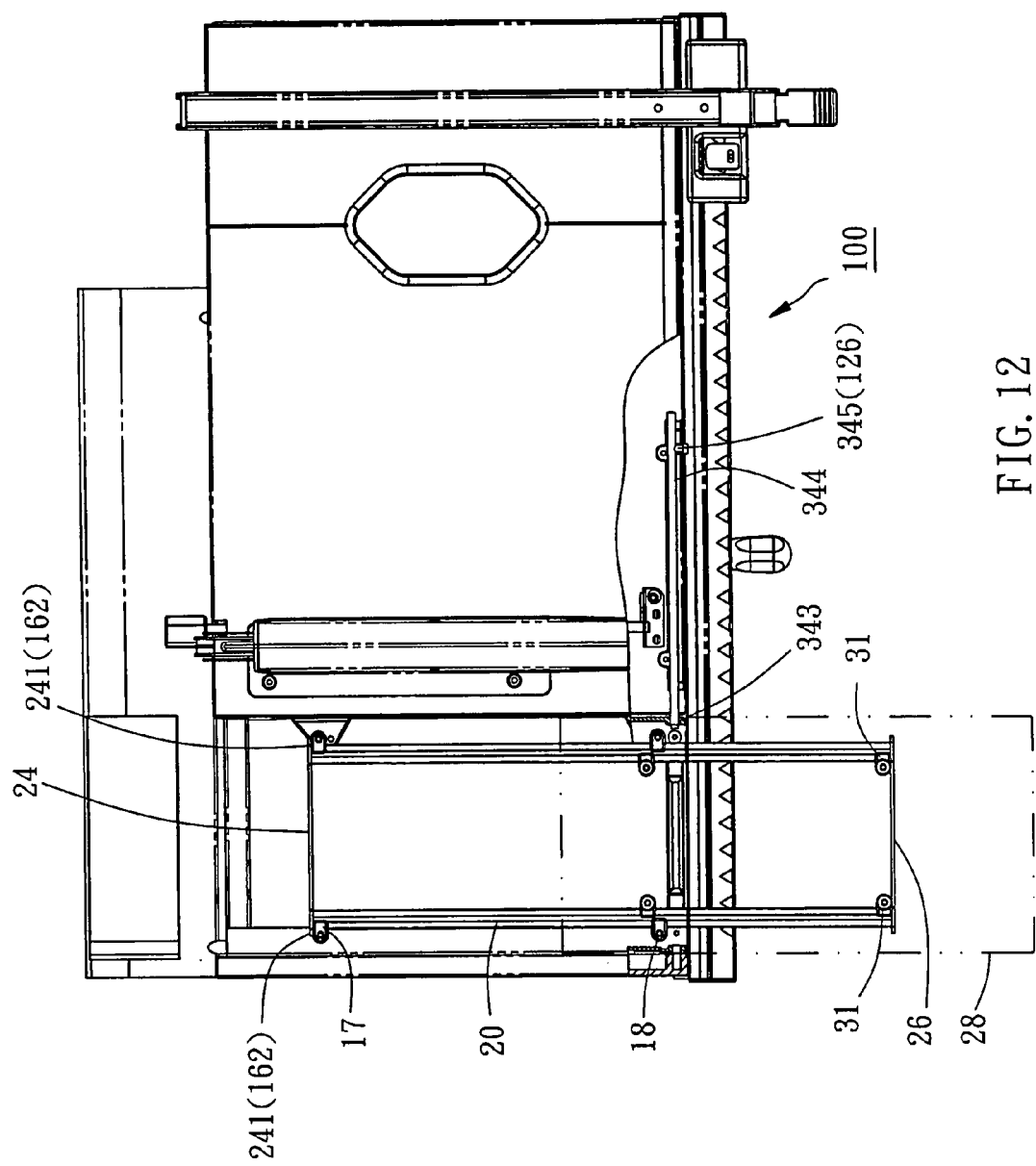
FIG. 12 is a top view of the worktable corresponding to the position shown in FIG. 11, showing the positioning rod locked the sliding plate.

When wishing to push the sliding plate 28 out of the base 10 in order to increase the working area of the worktable, push the positioning rod 344 backwards, as shown in FIG. 8, to engage the finger block 345 into the notch 125, preventing displacement of the positioning rod 344. Thereafter, as shown in FIG. 9, the sliding plate 28 is pushed in the first direction D1 to stop the first push portion 302 of each of the second rails 30 against the second end strip 26. At this time, we can move the positioning rod 344 to selectively force the finger block 345 into the notch 126, as shown in FIG. 10, so that one end of the positioning rod 344 can be inserted into the positioning hole 342 to stop the sliding plate 28 in position. Alternatively, we can keep moving the sliding plate 28, as shown in FIG. 11, thereby carrying the two guide rods 20 to the position where each lug 241 of the first end strip 24 is respectively stopped against the first stop 162 of the corresponding first rail 16. At this time, one end of the positioning rod 344 can be inserted into the positioning hole 343 and the finger block 345 is engaged into the notch 126, as shown in FIG. 12, to stop the sliding plate 28 from displacement. Further, under this condition, the sliding plate 28 effectively increases the workable area of the worktable 100. Because the sliding plate 28 does not protrude over the base 10 to a far distance at this time, carrying a heavy object on the sliding plate 28 does not cause the two guide rods 20 to deform or break.

When the position of the sliding plate 28 is changed, one end of the positioning rod 344 is properly inserted into one positioning hole 341, 342 and 343 in one side strip 282 of the sliding plate 28 to hold the sliding plate 28 on the supplementary platform 14 firmly in position, preventing trouble and inconvenience due to displacement of the sliding plate 28 accidentally during working, and improving the safeness of the operation of the machine.

Figure 13:
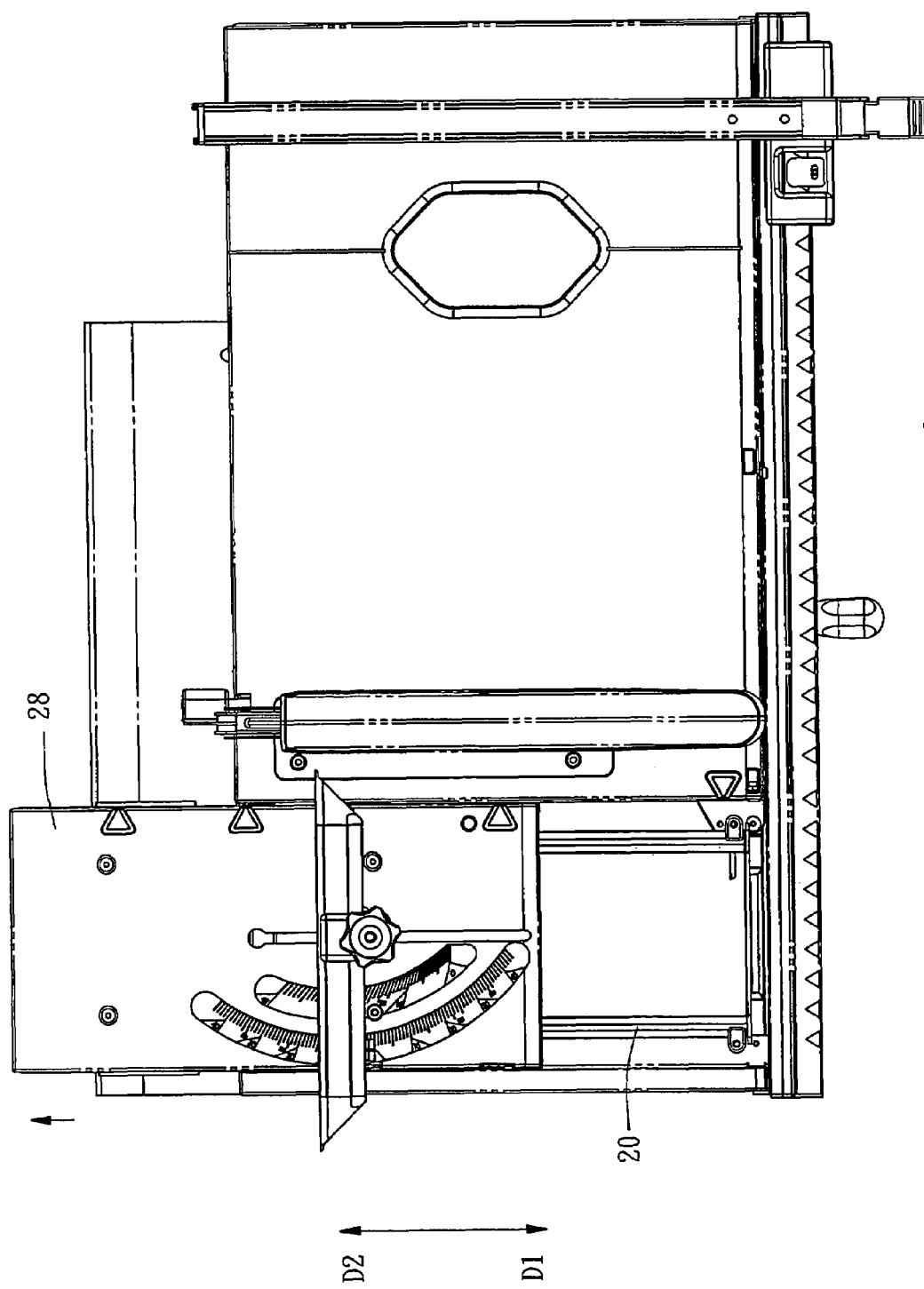
FIG. 13 corresponds to FIG. 11, showing the sliding plate moved in the second direction.
Figure 14:
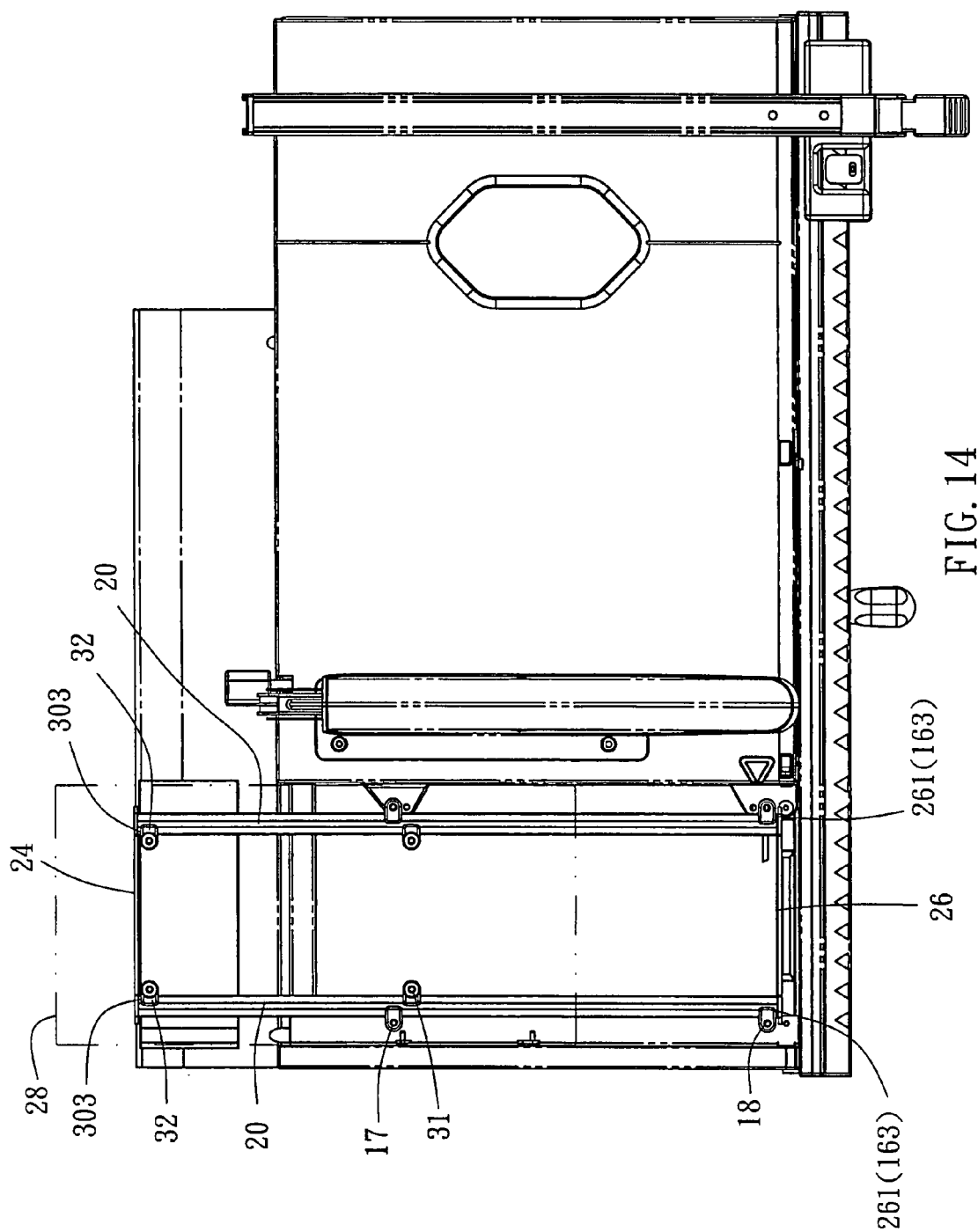
FIG. 14 is a top view of the worktable corresponding to the position shown in FIG. 13, showing the positioning of the sliding plate.

Referring to FIGS. 13 and 14, when moving the sliding plate 28 in the second direction D2, the second push portion 303 of each of the second rails 30 will be stopped against the first end strip 24, enabling the two guide rods 20 to be moved with the sliding plate 28 in the second direction D2 to the position where each lug 261 of the second end strip 26 is stopped against the second stop 163 of the corresponding first rail 16.

During the aforesaid operation, we can rotate the limiter 36 to force the end 362 against the respective guide rod 20, thereby holding down the respective guide rod 20. Thus, the moving range of the sliding pate 28 can be limited subject to a particular processing requirement.

Figure 15:
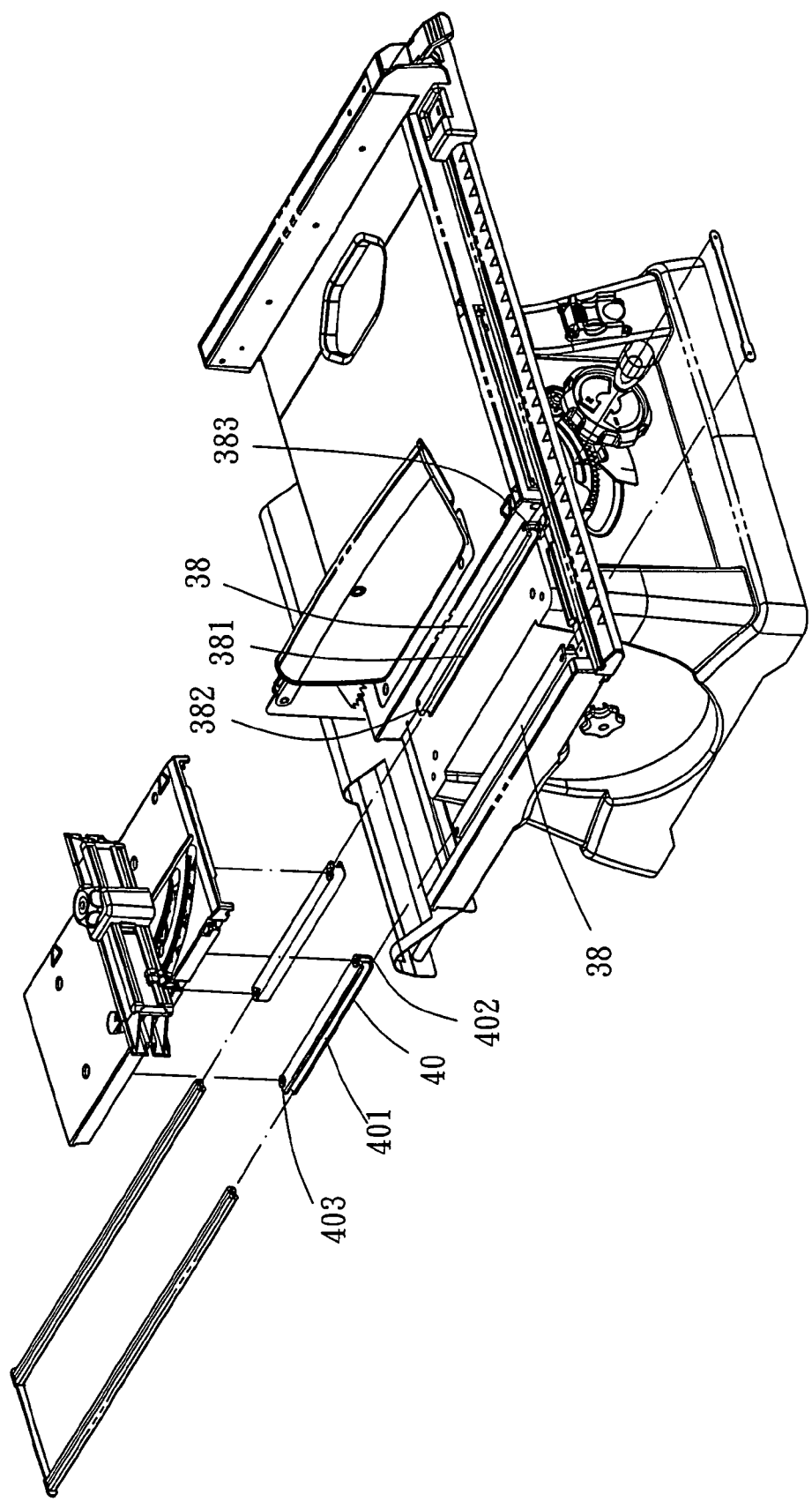
FIG. 15 is an exploded view of a worktable according to a second embodiment of the present invention.

FIG. 15 is an exploded view of the second embodiment of the present invention. According to this embodiment, the first rails 38 and the second rails 40 each are formed of one single solid bar. Each first rail 38 has a groove 381 extending along the length, a first stop 382 at one end, and a second stop 383 at the other end. Each second rail 40 has a groove 401 extending along the length, a first push portion 402 at one end, and a second push portion 403 at the other end.

Figure 16:
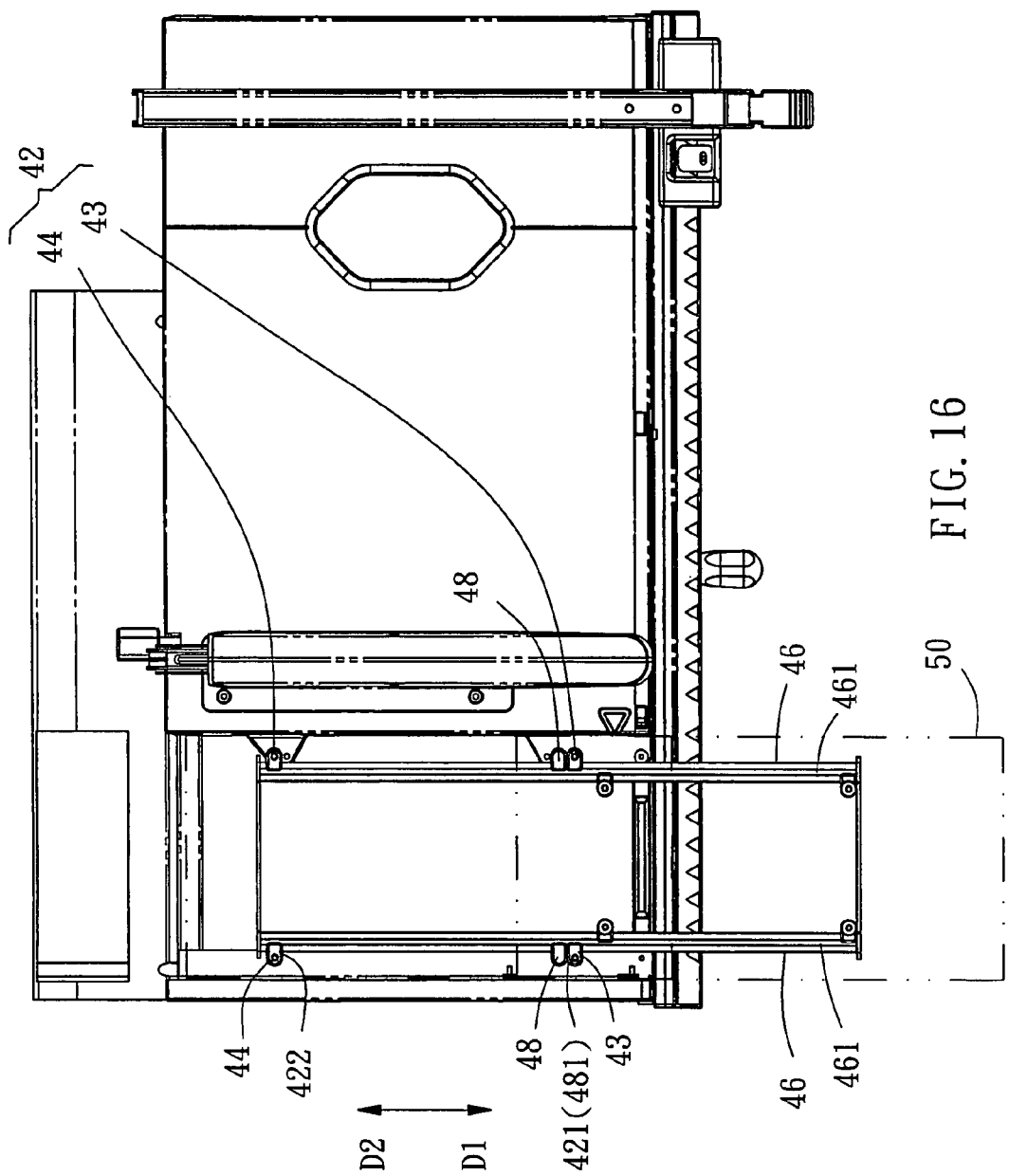
FIG. 16 is a top view of a worktable according to a third embodiment of the present invention, showing the sliding plate moved in the first direction.
Figure 17:
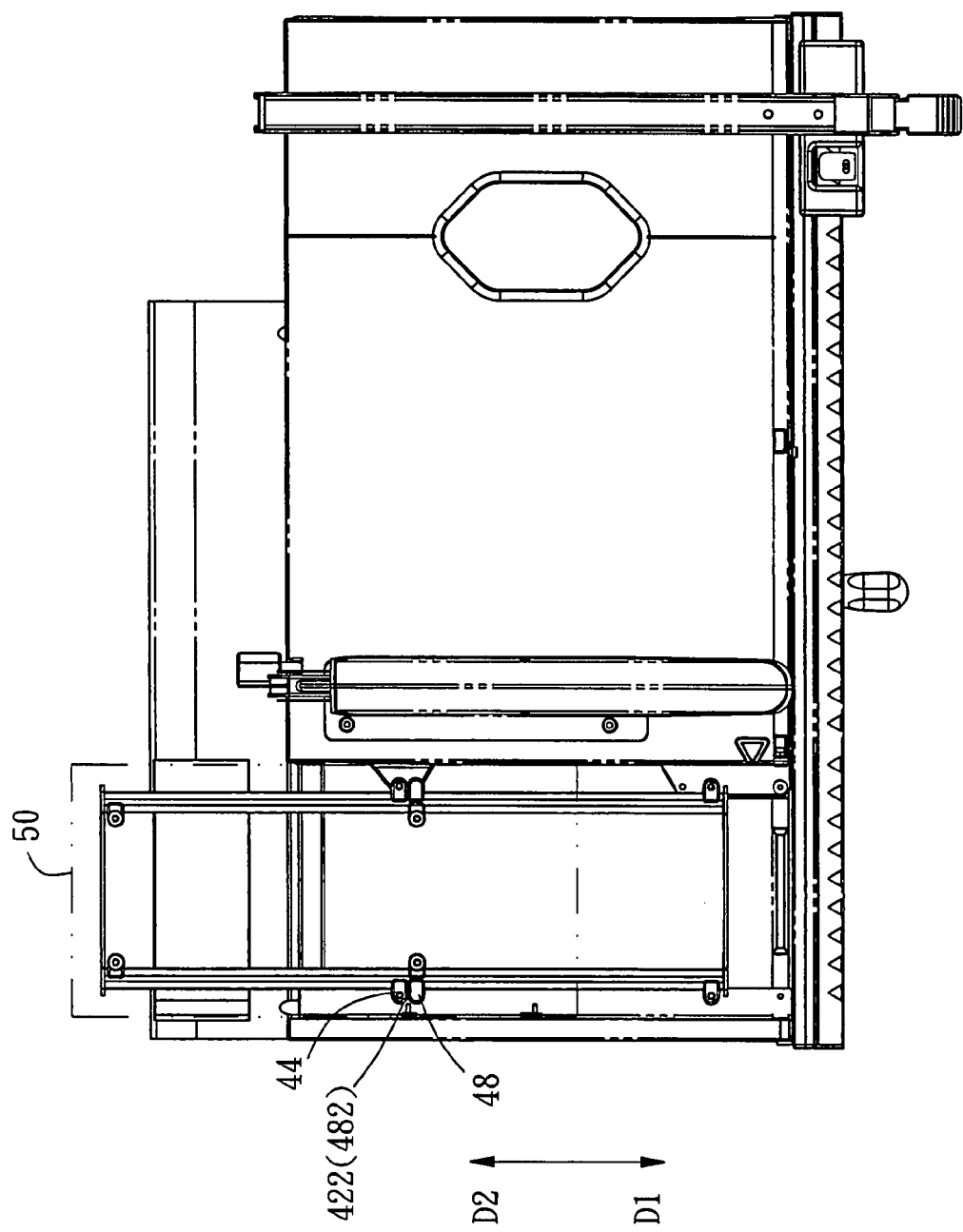
FIG. 17 is a schematic drawing of the third embodiment of the present invention, showing the sliding plate moved in the second direction.

FIG. 16 is an exploded view of the third embodiment of the present invention. According to this embodiment, the first stop 421 and the second stop 422 which are respectively formed in the first locating block 43 and second locating block 44 of the same first rail 42 are arranged facing each other. This embodiment further comprises two stop blocks 48 respectively provided at the first rod body 461 of each of the two guide rods 46. Each stop block 48 has a first stop portion 481 at one side, and a second stop portion 482 at the opposite side. When the first stop portion 481 of one stop block 48 touches the first stop 421 of the respective first rail 42, the guide rods 46 and the sliding plate 50 are prohibited from movement in the first direction D1. When the second stop portion 482 of one stop block 48 touches the second stop 422 of the respective first rail 42, the guide rods 46 and the sliding plate 50 are prohibited from movement in the second direction D2.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A worktable comprising:

a base having a top wall;

a least one first rail fixedly mounted on the top wall of said base, said at least one first rail each having a guide groove, a first stop and a second stop;

a least one guide rod respectively received in the guide groove of each of said at least one first rail and alternatively movable in a first direction and a second direction reversed to the first direction, said at least one guide rod each having a first end and a second end;

a first end strip fixedly fastened to the first end of each of said at least one guide rod for stopping said at least one guide rod from movement in said first direction when said first end strip contacts the first stop of each of said at least one first rail;

a second end strip fixedly fastened to the second end of each of said at least one guide rod for stopping said at least one guide rod from movement in said second direction when said second end strip contacts the second stop of each of said at least one first rail a sliding plate slidably supported on said at least one guide rod, said sliding plate having a bottom wall; and at least one second rail fixedly mounted on the bottom wall of said sliding plate, said at least one second rail having a guide groove, which receives one of said at least one guide rod, a first push portion, which enables said at least one guide rod to be moved in said first direction when touching said second end strip, and a second push portion, which enables said at least one guide rod to be moved in said second direction when touching said first end strip;

wherein said at least one first rail each is formed of one single solid bar, which has a first end forming the first stop of the respective first rail and a second end forming the second stop of the respective first rail, the guide groove of each of said at least one first rail extending along the length of the respective single solid bar.

* * * * *